(12) United States Patent
Shin

(10) Patent No.: US 8,489,697 B2
(45) Date of Patent: Jul. 16, 2013

(54) BROKERAGE SERVER FOR SUPPORTING FAST DATA ACCESS FOR USER TERMINAL, METHOD OF OPERATING BROKERAGE SERVER, USER TERMINAL AND METHOD OF OPERATING USER TERMINAL

(75) Inventor: Kyoung-heun Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 12/751,747

(22) Filed: Mar. 31, 2010

(65) Prior Publication Data

US 2011/0093554 A1 Apr. 21, 2011

(30) Foreign Application Priority Data

Oct. 16, 2009 (KR) .................. 10-2009-0098708

(51) Int. Cl.
*G06F 15/16* (2006.01)
*G06F 17/30* (2006.01)

(52) U.S. Cl.
USPC ........... 709/207; 709/224; 709/226; 707/769; 455/436; 455/456.1

(58) Field of Classification Search
USPC .......... 709/224, 226, 207; 707/769, E17.108; 455/440, 404.1, 412.1, 412.2, 404.2
See application file for complete search history.

(56) References Cited

U.S. PATENT DOCUMENTS

| | | | |
|---|---|---|---|
| 2002/0037731 A1* | 3/2002 | Mao et al. | 455/453 |
| 2002/0085719 A1* | 7/2002 | Crosbie | 380/248 |
| 2004/0133626 A1 | 7/2004 | Herrero et al. | |
| 2004/0255019 A1* | 12/2004 | Jardin et al. | 709/223 |
| 2006/0271664 A1* | 11/2006 | Ono et al. | 709/223 |
| 2008/0242275 A1* | 10/2008 | Yuba et al. | 455/414.1 |
| 2008/0274751 A1* | 11/2008 | Tinnakornsrisuphap et al. | 455/456.1 |
| 2008/0287094 A1 | 11/2008 | Keeler et al. | |
| 2009/0046679 A1* | 2/2009 | Isobe et al. | 370/338 |
| 2009/0209234 A1* | 8/2009 | Bright et al. | 455/412.2 |
| 2010/0174779 A1* | 7/2010 | Weiser et al. | 709/203 |
| 2010/0203901 A1* | 8/2010 | Dinoff et al. | 455/456.3 |
| 2011/0105118 A1* | 5/2011 | Tinnakornsrisuphap et al. | 455/435.1 |

FOREIGN PATENT DOCUMENTS

| | | |
|---|---|---|
| KR | 10-2001-0100892 | 11/2001 |
| KR | 10-2008-0100481 | 11/2008 |
| KR | 10-2009-0035612 | 4/2009 |
| WO | WO 2007/120488 | 10/2007 |
| WO | WO 2008/019094 | 2/2008 |

* cited by examiner

*Primary Examiner* — Wing F Chan
*Assistant Examiner* — Kostas Katsikis
(74) *Attorney, Agent, or Firm* — NSIP Law

(57) ABSTRACT

A service providing system using a brokerage server that supports fast data access according to a location of a user terminal when the user terminal uses a data center on the Internet is provided. The brokerage server receives an alarm message indicating that the user terminal has moved, from the user terminal, and generates a service quality alarm when the number of the received alarm messages exceeds a previously set number. The brokerage server determines a location of the user terminal as the service quality alarm is generated, and reallocates a data center capable of providing fast data access among a plurality of data centers according to the determined position.

19 Claims, 10 Drawing Sheets

FIG.4A

ALARM INFORMATION

| DEVICE_ID | USER_ID | IP | TIME ZONE | GPS Into |
|---|---|---|---|---|

FIG.4B

DATA CENTER INFORMATION

| CENTER_ID | NAME | DEPTH | LOCATION | TIME ZONE |
|---|---|---|---|---|

FIG.4C

HOME DATA CENTER LOCATION INFORMATION

| USER_ID | USER_NAME | CENTER_ID | UPDATE_TIME |
|---|---|---|---|

FIG.4D

VISIT DATA CENTER LOCATION INFORMATION

| USER_ID | USER_NAME | CENTER_ID | UPDATE_TIME | INSERTTIME |
|---|---|---|---|---|

FIG.4E

GROUP INFORMATION

| GROUP_ID | GROUP_NAME | USER_ID | CENTER_ID |
|---|---|---|---|

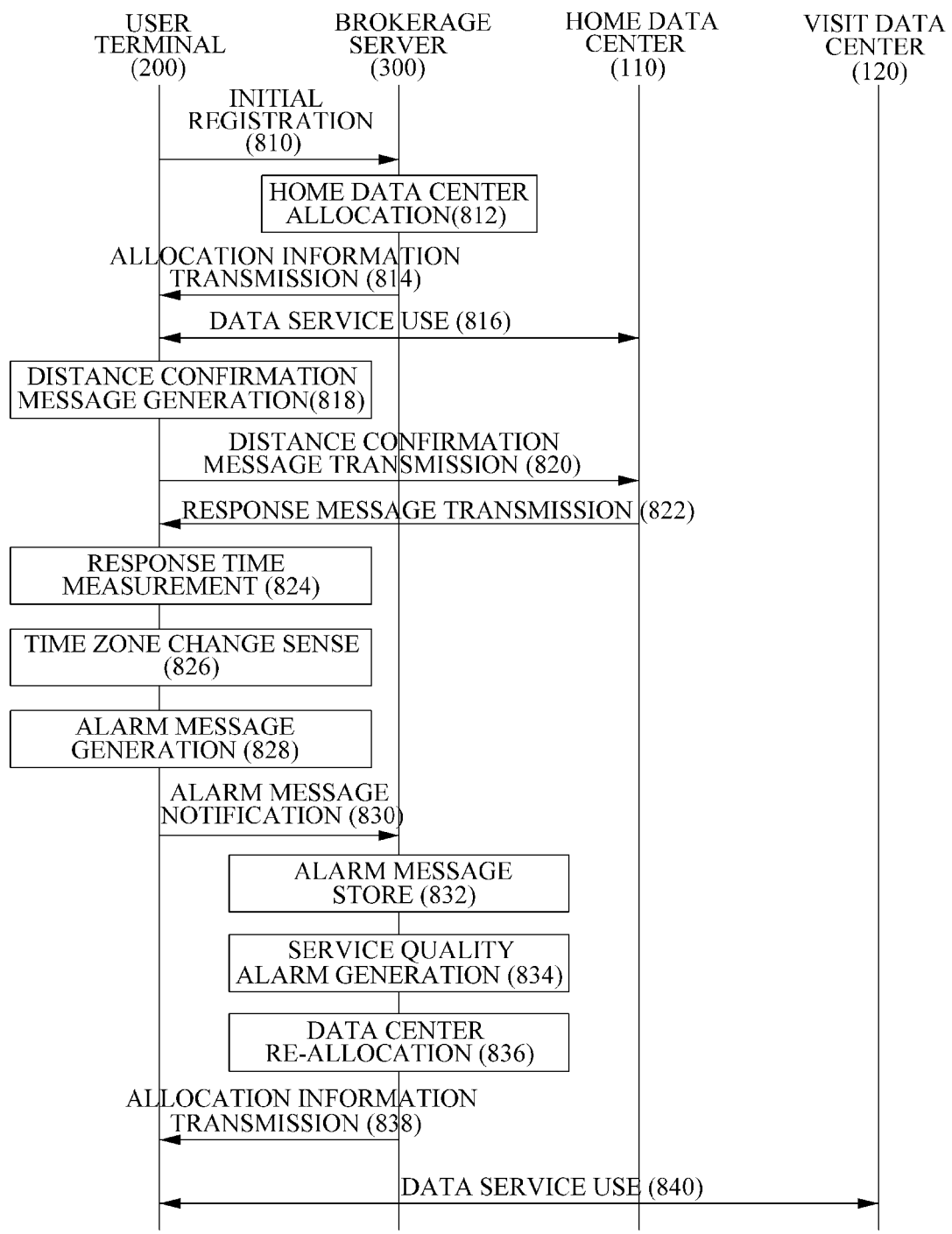

BROKERAGE SERVER FOR SUPPORTING FAST DATA ACCESS FOR USER TERMINAL, METHOD OF OPERATING BROKERAGE SERVER, USER TERMINAL AND METHOD OF OPERATING USER TERMINAL

CROSS-REFERENCE TO RELATED APPLICATION(S)

This application claims the benefit under 35 U.S.C. §119 (a) of Korean Patent Application No. 10-2009-0098708, filed on Oct. 16, 2009, in the Korean Intellectual Property Office, the entire disclosure of which is incorporated herein by reference for all purposes.

BACKGROUND

1. Field

The following description relates to a system for supporting fast data access to data that is stored in a data center infrastructure connected to a user terminal via the Internet.

2. Description of the Related Art

Content delivery network (CDN) services that provide digital contents such as music, games, movies, dramas, and the like to users quickly and safely are increasing in popularity. For the CDN service, contents having a large capacity or contents frequently required by users among contents in a web server of a content provider (CP) are stored in advance in CDN servers disposed at primary points of a network, and delivered from the CDN servers to users via optimal paths. Meanwhile, cloud computing may effectively integrate distributed resources using the Internet. CDN service has recently been provided as a cloud computing service.

SUMMARY

In one general aspect there is provided a brokerage server including a communication unit configured to receive, from a user terminal, an alarm message indicating that the user terminal has moved, and generate a service quality alarm when the number of the received alarm messages exceeds a previously set number, and a location analyzer configured to determine a location of the user terminal as the service quality alarm is generated, and allocate a data center capable of providing data access to the user terminal among a plurality of data centers according to the determined position.

The location analyzer may determine the location of the user terminal using an IP address of the user terminal included in the received alarm message and allocate a data center closest to the determined location of the user terminal among the plurality of data centers as a data center for the user terminal.

The brokerage server may further include a data center information database in which location information and time zone information of the plurality of data centers may be managed according to two or more regional hierarchical structures. The location analyzer may search for at least one data center belonging to a time zone to which the user terminal belongs using time zone information of the user terminal included in the received alarm message, and provide information for the searched data center to the user terminal via the communication unit.

The location analyzer may allocate the data center to the user terminal using an IP address of the user terminal delivered from the user terminal when the user terminal accesses for the first time, and manage the allocated data center as a home data center, and the location analyzer may allocate a new data center to the user terminal using location information of the user terminal included in the received alarm message when the service quality alarm is generated while the user terminal is using the home data center, and manage the new data center as a visit data center.

The brokerage server may further include a home-data-center location information database storing location information of the home data center, and a visit-data-center location information database storing location information of the visit data center.

The location analyzer may analyze location information included in the alarm message received from the user terminal during a previously set period and determine a move pattern of the user terminal.

The location analyzer may determine the movement pattern to be a temporary movement when the user terminal uses the visit data center during a first period, determine the movement pattern to be a return after a temporary movement when a new alarm message is received from the user terminal and the allocated data center is determined to be a home data center from location information of the user terminal included in the new alarm message, after the movement pattern is determined to be the temporary movement, determine the movement pattern to be a permanent movement when the user terminal uses the visit data center during a second period longer than the first period, and determine the movement pattern to be a re-movement when a new alarm message is received from the user terminal and a newly allocated data center is determined to be neither the home data center nor the visit data center from location information of the user terminal included in the new alarm message, after the movement pattern is determined to be the temporary movement.

The brokerage server may further include a data controller controlling data of the user terminal stored in at least one data center allocated to the user terminal, according to the determined movement pattern.

The data controller may copy the data of the user terminal stored in the home data center to the visit data center when the movement pattern of the user terminal is the temporary movement, delete the copied data from the visit data center when the movement pattern of the user terminal is the return after a temporary movement, move all pieces of the data of the user terminal stored in the home data center to the visit data center when the movement pattern of the user terminal is the permanent movement, and move all pieces of the data of the user terminal copied to the visit data center to a new visit data center allocated by the location analyzer when the movement pattern of the user terminal is the re-movement.

The brokerage server may further include a group information database storing location information of user terminals in each group. The location analyzer may search for location information of at least one other user terminal in a group to which the user terminal belongs from the group information database, and allocate one data center having the shortest average distance from the user terminals in the group, as a data center for the user terminals belonging to the group.

The location analyzer may allocate a plurality of data centers belonging to the same or adjacent time zones to the user terminals belonging to the group.

In another aspect, there is provided a user terminal connected to a plurality of data centers and a brokerage server supporting fast data access for a user terminal by allocating at least one of the plurality of data centers. The user terminal receives data from the allocated data center and includes a controller configured to sense a movement of the user terminal and generate an alarm message indicating that the user terminal has moved, when the movement of the user terminal is sensed, and a communication unit configured to transmit the generated alarm message to the brokerage server.

The controller may confirm whether a time zone of the user terminal has been changed and sense that the user terminal has moved when the time zone of the user terminal has been changed.

The controller may generate a distance confirmation message, transmit the generated distance confirmation message to the allocated data center, and sense the movement of the user terminal using a response time of the data center responding to the distance confirmation message.

The controller may generate the distance confirmation message using an HTTP head message.

The controller may generate an alarm message including an IP address and time zone information of the user terminal.

The user terminal may further include a GPS receiver receiving GPS location information. The controller may generate an alarm message including the GPS location information.

In still another aspect, there is provided a method of operating a brokerage server, the method including receiving, from a user terminal, an alarm message indicating that the user terminal has moved, generating a service quality alarm when the number of the alarm messages received from the user terminal exceeds a previously set number, determining a location of the user terminal as the service quality alarm is generated, and allocating a data center capable of providing fast data access to the user terminal among a plurality of data centers, according to the determined position.

In yet another aspect, there is provided a method of operating a user terminal connected to a plurality of data centers and a brokerage server allocating a data center capable of providing fast data access to the user terminal among the plurality of data centers. The user terminal receives data from the data center and the method includes sensing a movement of the user terminal, in response to the movement being sensed, generating an alarm message indicating that the user terminal has moved, and transmitting the generated alarm message to the brokerage server.

Other features and aspects will be apparent from the following detailed description, the drawings, and the claims.

BRIEF DESCRIPTION OF THE DRAWINGS

FIG. 4A is a diagram illustrating an example of alarm information.

FIG. 4B is a diagram illustrating an example of data center information.

FIG. 4C is a diagram illustrating an example of home data center location information.

FIG. 4D is a diagram illustrating an example of visit data center location information.

FIG. 4E is a diagram illustrating an example of group information.

FIG. 8 is a flowchart illustrating an example of a method of supporting fast data access.

Figure 1:
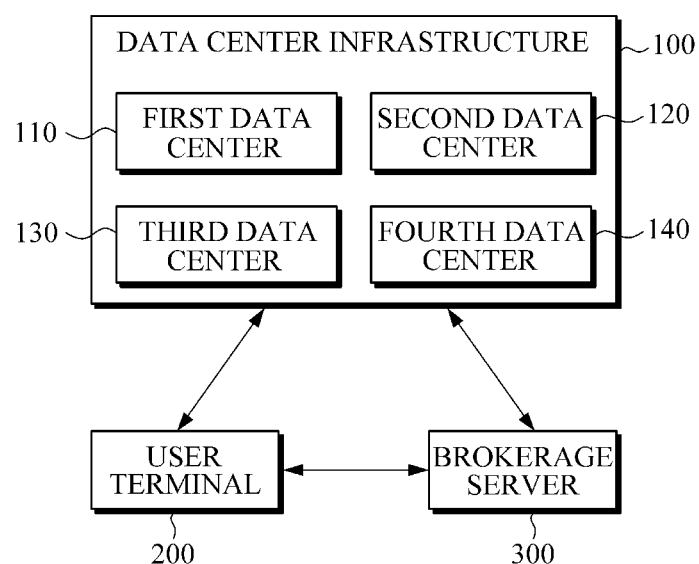
FIG. 1 is a diagram illustrating an example of an environment supporting fast data access.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of an environment supporting fast data access.

By way of example, in the environment of FIG. 1, a data center infrastructure 100, a user terminal 200, and a brokerage server 300 are connected to one another via the Internet.

The data center infrastructure 100 may refer to a server environment or a set of servers providing various data to the user terminal 200. The data center infrastructure 100 may be a server of a content provider and may be a cloud infrastructure providing cloud computing service for content provision. A manager or a management structure of the data center infrastructure 100 is not limited, as any suitable manager or management structure may be utilized. Here, the various data may include, for example, multimedia contents such as music, games, movies, or dramas that may be shared among a number of users, as well as content used by specific users, such as personal information, personal business files, and contents shared among people in a predetermined group. The listing of examples of various data above is non-exhaustive, and is not limited to the examples included in the list.

In the example shown in FIG. 1, the data center infrastructure 100 is shown as including a first data center 110, a second data center 120, a third data center 130 and a fourth data center 140. However, this is shown simply for illustration purposes. There may be a plurality of data centers and the number of data centers is not limited to those depicted in figures. The first data center 110, the second data center 120, the third data center 130 and the fourth data center 140 may be located at different positions, such as different continents, countries or cities, for example.

As a non-exhaustive example, the user terminal 200 described herein may refer to mobile devices such as cellular phone, a personal digital assistant (PDA), a digital camera, a portable game console, an MP3 player, a portable/personal multimedia player (PMP), a handheld e-book, a portable laptop PC, a global positioning system (GPS) navigation, and devices such as a desktop PC, a high definition television (HDTV), an optical disc player, a set-top box, and the like capable of wireless or communications consistent with that disclosed herein. Although one user terminal 200 is shown in FIG. 1, there may be a plurality of user terminals in an Internet environment.

The user terminal 200 is allocated a data center, e.g., the first data center 110 in the data center infrastructure 100, by the brokerage server 300. The user terminal 200 may receive various data from the first data center 110 and process the received data. The user terminal 200 senses a movement of the user terminal 200, and generates an alarm message and transmits the alarm message to the brokerage server 300 when the movement is sensed.

The brokerage server 300 allocates, to the user terminal 200, a data center in the data center infrastructure 100 suitable for support of fast data access according to the location of the user terminal 200. Since the user terminal 200 is likely to be primarily used in a specific region, the brokerage server 300 may allocate a data center geographically close to a location of the user terminal 200.

When it is determined that the user terminal 200 uses service using the data center infrastructure 100 for the first time, the brokerage server 300 receives information included in the alarm message from the user terminal 200, such as an IP address of the user terminal 200, terminal identification information or login information such as user identification information, and determines geographical location information of the user terminal 200 using the IP address of the user terminal 200.

The brokerage server 300 may determine the location of the user terminal 200 using a separate external Internet service such as an IP lookup tool indicating geographical location information of a device, such as latitude and longitude information using an IP address. When the user terminal 200 includes a global positioning system (GPS) receiver, the brokerage server 300 receives GPS location information of the user terminal 200 from the user terminal 200.

Accordingly, the brokerage server 300 may allocate a data center in the data infrastructure 100 geographically closer to the user terminal 200 as a home data center for the user terminal 200 using the geographical location information of the user terminal 200. Thus, it is assumed that the home data center for the user terminal 200 is the first data center 110 in one example.

The brokerage server 300 may provide the allocation information of the first data center 110, e.g., an IP address of the first data center 110, to the user terminal 200. Accordingly, the user terminal 200 registered once in the brokerage server 300 may access the first data center 110 using the IP address of the first data center 110 to upload data, and receive uploaded data or data according to content providing service provided by the first data center 110 from the first data center 110 to use the data.

When the location of the user terminal 200 is changed, for example, due to a business trip, home relocation, travel, immigration, etc. of a user, it is inefficient to continue to receive a data service using the first data center 110 in spite of the changed user location. For example, when the user terminal 200 using the first data center 110 located in Seoul has moved to the United States of America, it is inefficient to continue to receive data service using the first data center 110 in terms of service quality, such as service delay for example, when the user terminal 200 could be using a data center located in the United States of America, e.g., the second data center 120.

According to one example, the user terminal 200 senses the movement of the user terminal 200, generates an alarm message indicating that the user terminal 200 has moved when the movement is sensed, and transmits the generated alarm message to the brokerage server 300. The brokerage server 300 may receive the alarm message from the user terminal 200, and count the alarm messages. When the number of the alarm messages received from the user terminal 200 exceeds a previously set number, the brokerage server 300 may generate a service quality alarm (AccessQoSAlarm) indicating that service quality for the user terminal 200 has been degraded due to the movement of the user terminal 200. The brokerage server 300 may again determine the location of the user terminal 200 when the service quality alarm is generated, and reallocate the data center in the data center infrastructure 100 suitable for fast data access support according to the determined location.

Here as well, the brokerage server 300 may reallocate a data center geographically closer to the user terminal 200 according to the new location of the user terminal 200. In this case, when a data center at a different location from the home data center, e.g., the second data center 120, is allocated, the second data center 120 may be allocated as a visit data center. Then, the user terminal 200 may access the second data center 120 to receive data service.

Figure 2:
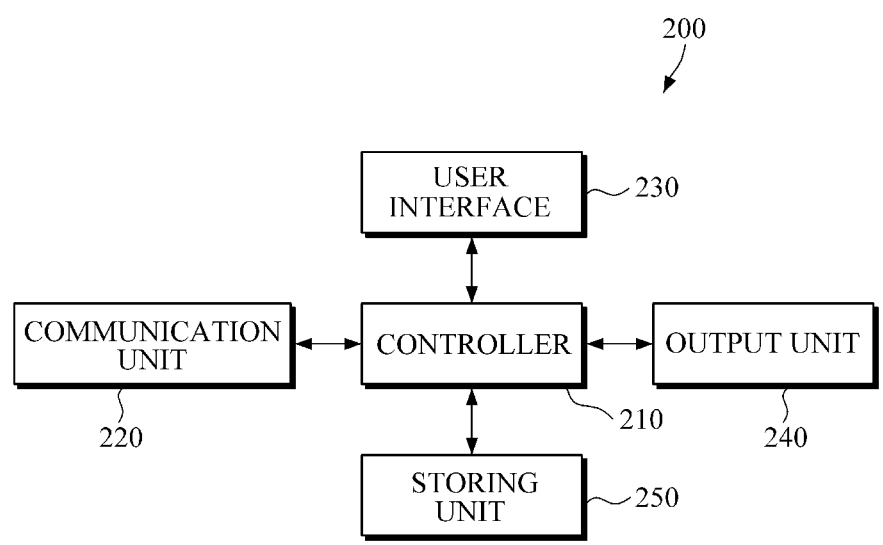
FIG. 2 is a diagram illustrating an example of a user terminal.

FIG. 2 illustrates an example of a user terminal 200.

The user terminal 200 includes a controller 210, a communication unit 220, a user interface 230, an output unit 240, and a storing unit 250.

The controller 210 controls all operation of the user terminal 200. The controller 210 may operate so that a user can use a content data service provided by the data center in the data center infrastructure 100 allocated by the brokerage server 300.

The communication unit 220 may be configured for communication with the data center in the data center infrastructure 100 allocated by the brokerage server 300 and with the brokerage server 300.

The user interface 230 receives a user input signal and delivers the user input signal to the controller 210. The user interface 230 may include any user-input receiving device, such as a touch screen, a touch pad, a key pad, a jog and shuttle, and the like. However, the user-input receiving device is not limited to the examples listed above.

The output unit 240 may output contents executed by the controller 210. The output unit 240 may include a display device, an audio output device, and the like.

The storing unit 250 may store an operating system, applications, and data to be executed by the controller 210.

The controller 210 senses a movement of the user terminal 200. When the movement of the user terminal 200 is sensed, the controller 210 generates an alarm message indicating that the user terminal 200 has moved and transmit the generated alarm message to the brokerage server 300 via the communication unit 220.

The controller 210 confirms whether a time zone of the user terminal 200 indicating areas that use the same standard time has been changed, and senses that the user terminal 200 has moved when the time zone has been changed. When time information is directly input to the user terminal 200 via the user interface 230, or time information is input to the user terminal 200 from another electronic device or service providing server, the controller 210 may compare the input time information with previously set time information to determine whether the time zone has been changed.

Alternatively, the controller 210 may transmit a generated distance confirmation message to a data center in use, e.g., the first data center 110, receive a response message corresponding to the distance confirmation message from the first data center 110, and sense the movement of the user terminal 200 using a distance confirmation message transmission time and a response message reception time.

The controller 210 may generate the distance confirmation message using, for example, an HTTP head message. The generated distance confirmation message is delivered to the brokerage server 300 via the communication unit 220. When the response message corresponding to the distance confirmation message, e.g., a head response message corresponding to an HTTP head message, is received from the brokerage server 300, the controller 210 may confirm a response time "t" taken until receiving the response message after transmitting the distance confirmation message. For this, the controller 210 may confirm the response time t by driving a timer until the response message is received after the distance confirmation message is transmitted from the communication unit 220.

When the response time t is smaller than a previously set time Tm, the controller 210 controls the communication unit 220 to receive the data service using the first data center 110, which has been allocated previously, instead of generating the alarm message. However, if the response time t is greater than the previously set time Tm, the controller 210 may determine that the user terminal 200 has moved, generate the alarm message, and transmit the alarm message to the brokerage server 300. The controller 210 may generate an alarm message including an IP address of the user terminal 200. According to one example, the alarm message may include a device ID of the user terminal 200, a user ID, the IP address, and time zone information.

The user terminal 200 may further include a GPS receiver (not shown) receiving GPS location information. The controller 210 may include GPS location information in the alarm message.

Figure 3:
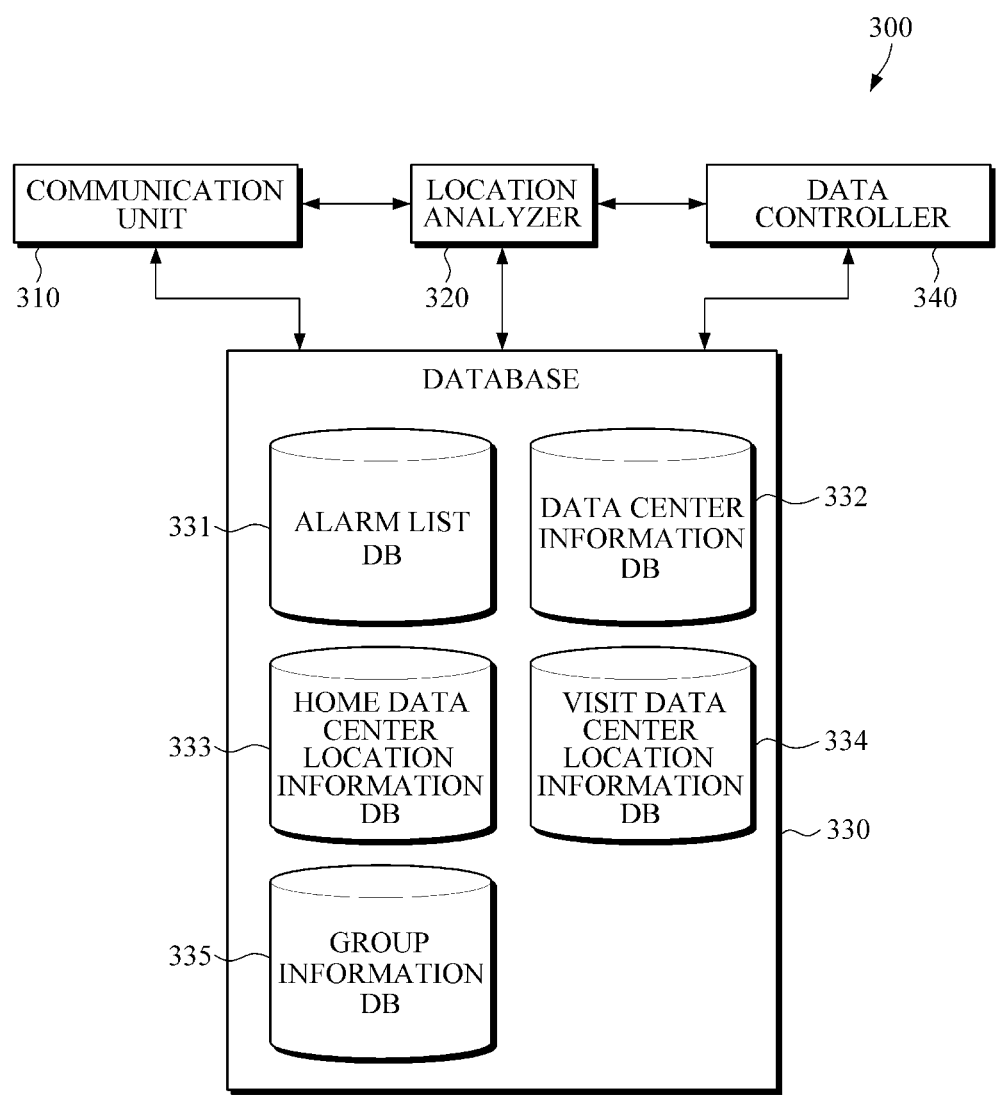
FIG. 3 is a diagram illustrating an example brokerage server.

FIG. 3 illustrates an example of a brokerage server 300.

The brokerage server 300 includes a communication unit 310, a location analyzer 320, a database 330, and a data controller 340. Although the brokerage server 300 allocates a data center to a plurality of user terminals, it is assumed, for the purposes of this example, that the brokerage server 300 allocates the data center to the user terminal 200.

The communication unit 310 receives an alarm message indicating that one user terminal 200 has moved from the user terminal 200.

The location analyzer 320 may determine the location of the user terminal 200 using the IP address of the user terminal 200 included in the received alarm message, and allocate a data center located closest to the user terminal 200 among a plurality of data centers, as a data center for the user terminal 200.

The database 330 stores information required to allocate the data center to the user terminal 200. The database 330 may include an alarm list DB 331 storing the alarm message from the user terminal 200, a data center information DB 332 storing information for the data centers in the data center infrastructure 100, a home data center location information DB 333 storing location information of a home data center for each user terminal, a visit data center location information DB 334 storing location information of a visit data center for each user terminal, and a group information DB 335.

The data controller 340 performs operations such as data copy, move, and delete when the data center is allocated to the user terminal 200.

A structure of the database 300 and information stored in the database 300 are described with reference to FIG. 3 and FIGS. 4A to 4E, to illustrate examples. FIG. 4A illustrates an example of alarm information, FIG. 4B illustrates an example of data center information, FIG. 4C illustrates an example of home data center location information, FIG. 4D illustrates an example of visit data center location information, and FIG. 4E illustrates an example of group information.

The alarm list DB 331 may store alarm messages received and accumulated from the user terminal 200. The alarm list DB 331 may store the alarm message for at least one user terminal. As shown in FIG. 4A, the alarm list DB 331 may include, for example, a device ID DEVICE_ID, user ID USER_ID, IP address IP, time zone information TIME ZONE and GPS information GPS Info included in the alarm message. The alarm list DB 331 may further include alarm message count information incrementing each time the alarm message is received from the same user terminal.

The data center information DB 332 may store information for the data centers included in the data center infrastructure 100. The data center DB 332 may store data center identification information CENTER_ID, data center name NAME, data center hierarchy information DEPTH, data center location information LOCATION and time zone information TIME ZONE as information for one data center, as shown in FIG. 4B. The data center hierarchy information DEPTH indicates level information when a plurality of data center location information and time zone information of the data centers in the data center infrastructure 100 are managed according to two or more regional hierarchical structures.

The home data center location information DB 333 stores information for a data center allocated as the home data center to user terminals, including the user terminal 200, by the location analyzer 320. The home data center location information may include, for example, user identification information USER_ID, user name USER_NAME, center identification information CENTER_ID, and update time information UPDATE_TIME, as shown in FIG. 4C. The update time information indicates a time when a home data center location is updated.

The visit data center location information DB 334 stores information for a data center allocated as the visit data center to user terminals by the location analyzer 320. The visit data center location information may include, for example, user identification information USER_ID, user name USER_NAME, center identification information CENTER_ID, update time information UPDATE_TIME, and access time information INSERT_TIME, as shown in FIG. 4D. The access time information may be information on a last access time when the user terminal 200 accesses the data center.

The group information DB 335 stores information of user terminals in each group. The group information DB 335 may store group information including, for example, group identification information GROUP_ID, group name GROUP_NAME, user ID USER ID, and data center ID DATA CENTER_ID, as shown in FIG. 4E. In addition, the group information DB 335 may store location information of user terminals in each group.

Operation of the brokerage server 300 is described with reference to FIG. 3.

The communication unit 310 receives the alarm message from the user terminal 200, and stores the received alarm message in the alarm list DB 331. The communication unit 310 may confirm information included in the received alarm message and search for the home data center DB 332 using the confirmed information to determine whether the user terminal 200 accesses the brokerage server 300 for the first time. When the user terminal 200 accesses for the first time, the location analyzer 320 may allocate the first data center 110 as a home data center to the user terminal 200 using the location information of the user terminal 200. The location analyzer 320 may add and manage information of the first data center 110 in the home data center location information DB 333, as home data center location information of the user terminal 200.

When the number of the alarm messages received from the user terminal 200 exceeds a previously set number while the user terminal 200 is using the first data center 110, the communication unit 310 may generate the service quality alarm (AcessQoSAlarm). The location analyzer 320 may determine a location of the user terminal 200 when the service quality alarm is generated, and reallocate a data center suitable for fast data access support among a plurality of data centers according to the determined position. Accordingly, the location analyzer 320 may allocate the second data center 120 as the visit data center according to the data center reallocation. The location analyzer 320 may add and manage information of the second data center 120 to the visit data center location information DB 334, as visit data center location information of the user terminal 200.

Next, operation in which the location analyzer 320 allocates a data center geographically closer to the user terminal 200 is described.

As described above, the location analyzer 320 may obtain a geographical location of the user terminal 200 using an IP lookup tool in which geographical location information (e.g., latitude and longitude information) is mapped to the IP address of the user terminal 200. The location analyzer 320 may search for a data center close to the obtained geographical location information of the user terminal 200 from the data center DB 332 and allocate the searched data center to the user terminal 200.

Alternatively, the location analyzer 320 may determine a data center to be allocated to the user terminal 200 using the alarm message, or the time zone information of the user terminal 200 received from another user terminal 200. Specifically, the location analyzer 320 may search for at least one data center belonging to the time zone of the user terminal 200 from the data center information DB 332. The location analyzer 320 may extend a data center search range to a time zone adjacent to the time zone of the user terminal 200. The location analyzer 320 transmits information for the at least one searched data center 200, such as IP information of the data center, to the user terminal 200 via the communication unit 310. The user terminal 200 performs a ping test on the searched data centers using the IP information of the searched data center, and transmits the result of the ping test to the brokerage server 300. The location analyzer 320 may allocate a data center having the shortest response time as the data center for the user terminal 200 using the ping test result received from the user terminal 200.

In order to determine the geographical location of the user terminal 200, a scheme of using an IP lookup tool and a scheme of using time zone information of the user terminal 200 may be selectively used. Alternatively, both the scheme of using an IP lookup tool and the scheme of using time zone information of the user terminal 200 may be used and then locations of the user terminal 200 determined by the two schemes may be synthetically analyzed, such that the data center for the user terminal 200 may be allocated.

Meanwhile, the location analyzer 320 may search for information included in the alarm message received from the communication unit 310, from the group information DB 335, to determine whether the user terminal 200 belongs to a predetermined group. When the user terminal 200 belongs to the predetermined group, the location analyzer 320 may confirm data center information allocated to the group to which the user terminal 200 belongs, from the group information DB 335.

Also, the location analyzer 320 may search for location information of at least one other user terminal belonging to the group to which the user terminal 200 belongs, from the group information DB 335, and allocate one data center having the shortest average distance between user terminals in the group to which the user terminal 200 belongs and the data center, as a data center for the user terminals belonging to the group. The location analyzer 320 may allocate a plurality of data centers belonging to the same time zone or an adjacent time zone in order to support fast data access for all the user terminals belonging to the group.

An operation in which the location analyzer 320 determines a movement pattern of the user terminal 200 and the data controller 340 performs data processing on the determined movement pattern is described with reference to FIG. 5.

Figure 5:
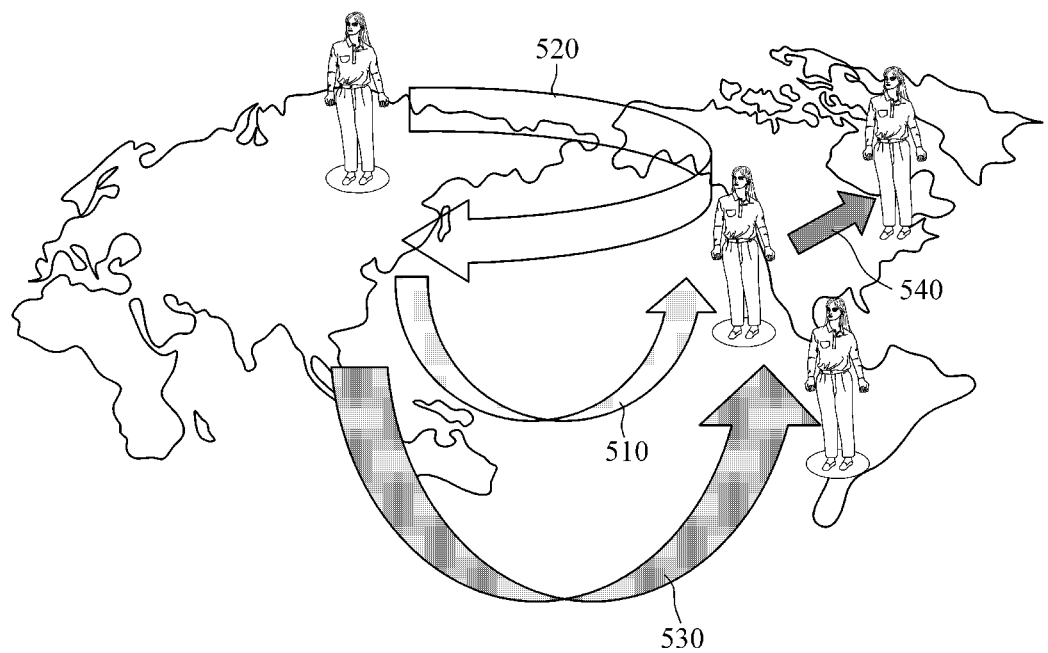
FIG. 5 is a diagram illustrating an example of a movement pattern of a user terminal based on the analysis of a location of the user terminal.

FIG. 5 illustrates an example of a movement pattern of a user terminal based on the analysis of a location of the user terminal.

The location analyzer 320 may analyze location information included in an alarm message received from one user terminal 200 during a previously set period to determine a movement pattern of the user terminal 200. The location analyzer 320 may determine the movement pattern of the user terminal 200 to be one of a temporary movement 510, a return after a temporary movement 520, a permanent movement 530 and a re-movement 540.

The temporary movement 510 indicates that the user terminal 200 has temporarily moved from an original place to another place due to, for example, study, travel, or the like of a user. The return after a temporary movement 520 indicates that the user terminal 200 has returned to an original place after moving from the original place to another place. The permanent movement 530 indicates that the user terminal 200 has permanently moved from an original place to another place, such as for immigration of the user. The re-movement 540 indicates that the user terminal 200 has moved from an original place to another place, and then to another new place other than original place. The data controller 340 may copy, move and delete the data of the user terminal 200 stored in at least one data center allocated to the user terminal 200 according to the determined movement pattern.

When the user terminal 200 is allocated the visit data center and uses the visit data center during a first period (e.g., three to six months), the location analyzer 320 may determine the movement pattern of the user to be the temporary movement 510. When the visit data center is allocated, the location analyzer 320 adds visit data center location information for the user terminal 200 to the visit data center location information DB 334 for information update. In this case, the data controller 340 may copy the data of the user terminal 200 stored in the home data center to the allocated visit data center.

When a new alarm message is received from the user terminal 200 and it is reallocated using location information of the user terminal 200 included in the new alarm message, and if the reallocated data center is a home data center after the movement pattern of the user terminal 200 is determined to be the temporary movement 510, the location analyzer 320 may determine the movement pattern of the user terminal 200 to be the return after a temporary movement 520. In this case, since the user terminal 200 no longer uses the visit data center, the location analyzer 320 deletes the visit data center location information for the user terminal 200 from the visit data center location information DB 334. In this case, the data controller 340 may delete the data of the user terminal 200 copied to the visit data center.

When the user terminal 200 uses the visit data center during a second period longer than the first period, the location analyzer 320 may determine the movement pattern of the user to be the permanent movement 530. When the movement pattern of the user terminal 200 is the permanent movement, the location analyzer 320 may change and allocate the home data center for the user terminal 200. For this, the location analyzer 320 may update the home data center location information of the user terminal 200 with the visit data center location information in the home data center location information DB 333, and delete the visit data center location information of the user terminal 200 from the visit data center location information DB 334. In this case, the data controller 340 may move all pieces of data from a previous home data center for the user terminal 200 to the visit data center, i.e., the new home data center.

When an alarm message is received from the user terminal 200 and a new data center is reallocated using location information of the user terminal 200 included in the alarm message, and if the new data center is neither a home data center nor a visit data center after the movement pattern of the user terminal 200 is determined to be the temporary movement 510, the location analyzer 320 may determine the movement pattern of the user terminal 200 to be the re-movement 540. When the movement pattern of the user terminal 200 is the re-movement, the location analyzer 320 updates the visit data location information for the user terminal 200 with location information of the newly allocated data center in the visit data center location information DB 334. In this case, the data controller 340 may move all pieces of the data of the user terminal 200 copied to the visit data center to the new visit data center allocated by the location analyzer 320.

Figure 6:
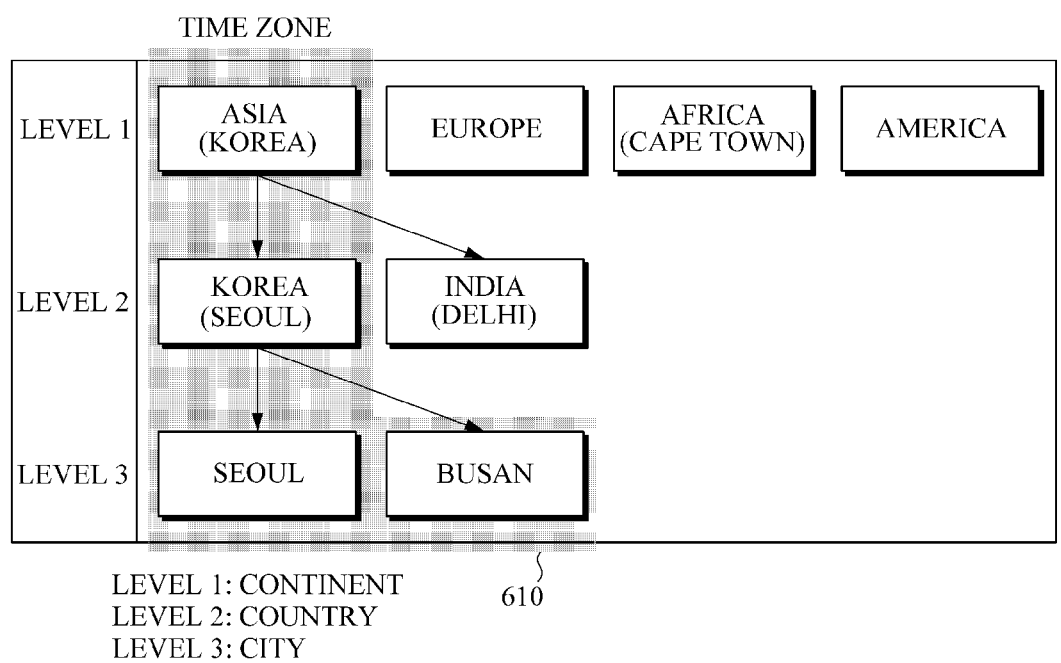
FIG. 6 is a diagram illustrating an example of a tree structure of a data center.

FIG. 6 illustrates an example of a tree structure of the data center.

The brokerage server 300 may manage the data center information in the data center information DB 332 in a hierarchical structure, for example as shown in FIG. 6, for the data center infrastructure 110. The brokerage server 300 may manage location information and time zone information of the data centers in the hierarchical structure, such as level 1: Continent; level 2: Country; and level 3: City.

The brokerage server 300 may search for, from the data center DB 332, information of the data center to be subjected to a ping test by the user terminal 200, according to a data center level in the tree structure shown in FIG. 6. The brokerage server 300 may determine an approximate geographical location of the user terminal 200 using time zone information of the alarm message received from the user terminal 200.

When the user terminal 200 is determined to be located in Asia, a representative data center of Asia is a data center in Korea, for example, and a representative data center of Korea is a "Seoul data center," the brokerage server 300 may search for a "Seoul data center" and a "Busan data center" located in the same time zone 610 as the geographical location of the user terminal 200. The brokerage server 300 delivers IP address information of the searched data centers to the user terminal 200. The user terminal 200 transmits the result of the ping test performed on the "Seoul data center" and the "Busan data center" to the brokerage server 300. When the received ping test result shows that a response time of the "Busan data center" is shorter, the brokerage server 300 may determine that the user terminal 200 is located closer to "Busan" than "Seoul" and allocate the "Busan data center."

Figure 7A:
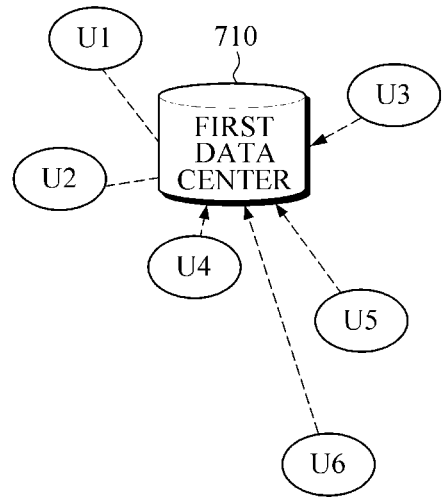
FIG. 7A is a diagram illustrating an example of allocation of a data center to users in a group.
Figure 7B:
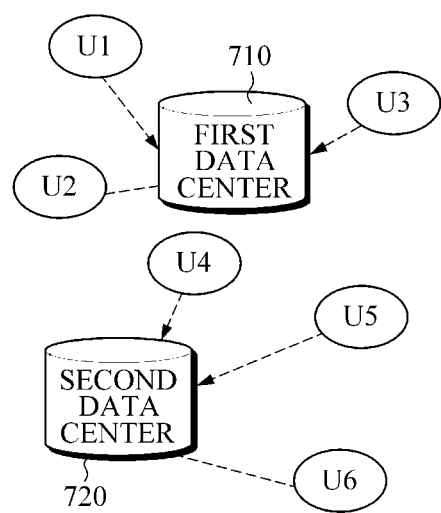
FIG. 7B is a diagram illustrating another example of allocation of a data center to users in a group.

FIG. 7A illustrates an example of allocation of a data center to users in a group, and FIG. 7B illustrates another example of allocation of a data center to users in a group.

When respective home data centers for user terminals of the users in the group sharing data are determined due to geographical distribution of the user terminals, it may be inefficient to store the shared data in the respective home data centers for the user terminal for data share among group users. In this case, the brokerage server 300 may designate a single data center for the group and store and manage the shared data in the single data center, as shown in FIG. 7, for example. The location analyzer 320 may designate a data center (e.g., a first data center 710) having the smallest average distance from the user terminals belonging to the group, as the data center for the group.

Meanwhile, when a very high data access speed is required, the brokerage server 300 may allocate two or more data centers to one group, although data must be duplicatively stored. For example, the brokerage server 300 may allocate two data centers 710 and 720, as shown in FIG. 7B, for example. In this case, the brokerage server 300 may designate several data centers in the same time zone or adjacent time zones so that the user terminals in the group can access a closer one of the data centers for fast data access. The brokerage server 300 may determine an average data center distance based on how fast access is required for service, and then designate the number and the object of data centers to be allocated.

FIG. 8 is a flowchart illustrating an example of a method of supporting fast data access.

The user terminal 200 performs initial registration in the brokerage server 300 (operation 810). When the user terminal 200 sends an alarm message to the brokerage server 300, the brokerage server 300 searches for the home data center location information DB 333 to determine whether the user terminal 200 accesses for the first time.

The brokerage server 300 may allocate the first data center 110 as a home data center based on the location information of the user terminal 200 (operation 812), and transmit allocation information to the user terminal 200 (operation 814). Information for the first data center 110 is added to the home data center location information DB 333 as home data center location information for the user. The user terminal 200 may then access the first data center 110 and use the data service (operation 816).

The user terminal 200 may generate a distance confirmation message at every previously set time (operation 818), and transmit the generated distance confirmation message to the first data center 110. The first data center 110 transmits a response message to the user terminal 200 in response to the distance confirmation message.

The user terminal 200 measures a response time t taken until receiving the response message after transmitting the distance confirmation message (operation 824). In this case, when the response time t is greater than a previously set time Tm, the user terminal 200 generates an alarm message (operation 828), and notifies the brokerage server 300 of the generated alarm message (operation 830). In FIG. 8, since the user terminal 200 is using the first data center 110, the user terminal 200 has transmitted the distance confirmation message to the first data center 110. However, when the user terminal 200 is using another data center, e.g., the visit data center 120, the user terminal may transmit the distance confirmation message to the visit data center 120.

Selectively, the alarm message generation and notification (operations 828 and 830) may be performed even when the user terminal 200 senses the movement by sensing a change of the time zone (operation 826).

The brokerage server 300 stores the alarm message received from the user terminal 200 (operation 832). Each time the alarm message is received from the user terminal 200, the brokerage server 300 accumulatively stores the alarm messages and counts the number of the alarm messages. The brokerage server 300 generates a service quality alarm when the number of the alarm messages received from the user terminal 200 is greater than a previously set number (operation 834).

When the service quality alarm is generated, the brokerage server 300 performs a data center re-allocation operation for the user terminal 200 (operation 836). When the data center is reallocated, the user terminal 200 may be allocated the second data center 120 as a visit data center. The visit data center allocation information is updated in the visit data center location information DB 334, and the data of the user terminal 200 stored in the first data center 110 is copied to the second data center 120.

The brokerage server 300 transmits allocation information for the second data center 120 to the user terminal 200 (operation 838) and, accordingly, the user terminal 200 may receive the data service using the second data center 120 (operation 840).

Thus, when the user terminal desires to access data provided by the data center on the Internet, the user terminal is allocated the data center according to the location of the user terminal, such that the user terminal may more efficiently access the data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structure, and the like. The media and program instructions may be those specially designed and constructed, or they may be of the kind well-know and available to those having skill in the computer software arts. Examples of computer-readable media include magnetic media, such as hard disks, floppy disks, and magnetic tape; optical media such as CD ROM disks and DVDs; magneto-optical media, such optical disks; and hardware devices that are specially configured to store and perform program instructions, such as read-only memory (ROM), random access memory (RAM), flash memory, and the like. Examples of program instruction include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device or circuit are combined in a different manner and/or replaced or supplemented by other components or their equivalents. Accordingly, other implementations are within the scope of the following claims.

What is claimed is:

1. A brokerage server, comprising:
a processor configured to
receive, from a user terminal, an alarm message indicating that the user terminal has moved, and
generate a service quality alarm in response to a number of the received alarm messages exceeding a previously set number; and
a location analyzer configured to
determine a location of the user terminal as the service quality alarm is generated,
allocate a data center capable of providing data access to the user terminal among a plurality of data centers according to the determined location,
determine a movement pattern to be a temporary movement in response to the user terminal using a visit data center during a first period, and
determine the movement pattern to be a permanent movement in response to the user terminal using the visit data center during a second period longer than the first period.

2. The brokerage server of claim 1, wherein the location analyzer is further configured to:
determine the location of the user terminal using an IP address of the user terminal included in the received alarm message; and
allocate a data center closest to the determined location of the user terminal among the plurality of data centers as a data center for the user terminal.

3. The brokerage server of claim 1, further comprising:
a data center information database configured to manage location information and time zone information of the plurality of data centers according to two or more regional hierarchical structures,
wherein the location analyzer is further configured to:
search for at least one data center belonging to a time zone to which the user terminal belongs using time zone information of the user terminal included in the received alarm message, and
provides information for the searched data center to the user terminal.

4. The brokerage server of claim 1, wherein the location analyzer is further configured to:
allocate the data center to the user terminal using an IP address of the user terminal delivered from the user terminal in response to the user terminal accessing for the first time;
manage the allocated data center as a home data center;
allocate a new data center to the user terminal using location information of the user terminal included in the received alarm message in response to the service quality alarm being generated while the user terminal is using the home data center; and
manage the new data center as the visit data center.

5. The brokerage server of claim 4, further comprising:
a home-data-center location information database configured to store location information of the home data center; and
a visit-data-center location information database configured to store location information of the visit data center.

6. The brokerage server of claim 1, wherein the location analyzer is further configured to:
analyze location information included in the alarm message received from the user terminal during a previously set period.

7. The brokerage server of claim 6, wherein the location analyzer is further configured to
determine the movement pattern to be a return after a temporary movement in response to a new alarm message being received from the user terminal and the allocated data center being determined to be a home data center from location information of the user terminal included in the new alarm message, after the movement pattern is determined to be the temporary movement, and determine the movement pattern to be a re-movement in response to a new alarm message being received from the user terminal and a newly allocated data center being determined to be neither the home data center nor the visit data center from location information of the user terminal included in the new alarm message, after the movement pattern is determined to be the temporary movement.

8. The brokerage server of claim 7, further comprising a data controller configured to control data of the user terminal stored in at least one data center allocated to the user terminal, according to the determined movement pattern.

9. The brokerage server of claim 8, wherein the data controller is further configured to:
copy the data of the user terminal stored in the home data center to the visit data center in response to the movement pattern of the user terminal being the temporary movement;
delete the copied data from the visit data center in response to the movement pattern of the user terminal being the return after a temporary movement;
move all pieces of the data of the user terminal stored in the home data center to the visit data center in response to the movement pattern of the user terminal being the permanent movement; and
move all pieces of the data of the user terminal copied to the visit data center to a new visit data center allocated by the location analyzer in response to the movement pattern of the user terminal being the re-movement.

10. The brokerage server of claim 1, further comprising:
a group information database configured to store location information of user terminals in groups;
wherein the location analyzer is further configured to:
search for location information of at least one other user terminal in a group to which the user terminal belongs from the group information database, and
allocate one data center, comprising a shortest average distance from the user terminals in the group, as a data center for the user terminals belonging to the group.

11. The brokerage server of claim 10, wherein the location analyzer is further configured to allocate a plurality of data centers belonging to the same or adjacent time zones to the user terminals belonging to the group.

12. A user terminal connected to a plurality of data centers and a brokerage server supporting fast data access for a user terminal by allocating at least one of the plurality of data centers, the user terminal receiving data from the allocated data center and comprising:
a controller configured to
sense a movement of the user terminal; and
generate an alarm message indicating that the user terminal has moved, in response to the movement of the user terminal being sensed; and
a processor configured to transmit the generated alarm message to the brokerage server wherein information in the generated alarm message is used to determine whether the user terminal access the brokerage server for a first time,
in response to the user terminal accessing the brokerage server for the first time, a first data center is allocated as a home data center of the user terminal using location information of the user terminal,
in response to a number of generated alarm messages transmitted from the user terminal exceeding a set number while the user terminal is using the first data center, a second data center is allocated as a visit data center,
in response to the user terminal using the visit data center during a first period, a movement pattern of the user terminal is determined as a temporary movement, and
in response to the user terminal using the visit data center during a second period longer than the first period, the movement pattern of the user terminal is determined a permanent movement.

13. The user terminal of claim 12, wherein the controller is further configured to:
confirm whether a time zone of the user terminal has been changed; and
sense that the user terminal has moved in response to the time zone of the user terminal having been changed.

14. The user terminal of claim 12, wherein the controller is further configured to:
generate a distance confirmation message;
transmit the generated distance confirmation message to the allocated data center; and
sense the movement of the user terminal using a response time of the data center responding to the distance confirmation message.

15. The user terminal of claim 14, wherein the controller is further configured to generate the distance confirmation message using an HTTP head message.

16. The user terminal of claim 12, wherein the controller is further configured to generate an alarm message comprising an IP address and time zone information of the user terminal.

17. The user terminal of claim 12, further comprising a GPS receiver configured to receive GPS location information;
wherein the controller is further configured to generate an alarm message comprising the GPS location information.

18. A method of operating a brokerage server, the method comprising:
receiving an alarm message, from a user terminal, indicating that the user terminal has moved;
generating a service quality alarm in response to a number of the alarm messages received from the user terminal exceeding a previously set number;
determining a location of the user terminal as the service quality alarm is generated; and
allocating a data center capable of providing data access to the user terminal among a plurality of data centers, according to the determined position;
determining a movement pattern to be a temporary movement in response to the user terminal using a visit data center during a first period, and
determining the movement pattern to be a permanent movement in response to the user terminal using the visit data center during a second period longer than the first period.

19. A method of operating a user terminal connected to a plurality of data centers and a brokerage server allocating a data center capable of providing fast data access to the user terminal among the plurality of data centers, the user terminal receiving data from the data center and the method comprising:
sensing a movement of the user terminal;
in response to the movement being sensed, generating an alarm message indicating that the user terminal has moved; and
transmitting the generated alarm message to the brokerage server, wherein information in the generated alarm message is used to determine whether the user terminal accesses the brokerage server for a first time, in response to the user terminal accessing the brokerage server for the first time, a first data center is allocated as a home data center of the user terminal using location information of the user terminal, in response to a number of generated alarm messages transmitted from the user terminal exceeding a set number while the user terminal is using the first data center, a second data center is allocated as a visit data center, in response to the user terminal using the visit data center during a first period, a movement pattern of the user terminal is determined as a temporary movement, and in response to the user terminal using the visit data center during a second period longer than the first period, the movement pattern of the user terminal is determined a permanent movement.

\* \* \* \* \*